US012401196B2

(12) United States Patent
Song et al.

(10) Patent No.: US 12,401,196 B2
(45) Date of Patent: Aug. 26, 2025

(54) ELECTRIC POWER QUALITY CONTROL METHOD AND DEVICE FOR OIL PRODUCTION PLATFORM, AND STORAGE MEDIUM

(71) Applicant: Cangzhou Power Supply Company, State Grid Hebei Electric Power Co., Ltd., Hebei (CN)

(72) Inventors: Wenle Song, Hebei (CN); Lei Wang, Hebei (CN); Yuanyuan Wang, Hebei (CN); Guidong Zhu, Hebei (CN)

(73) Assignee: Cangzhou Power Supply Company, State Grid Hebei Electric Power Co., Ltd., Cangzhou (CN)

( * ) Notice: Subject to any disclaimer, the term of this patent is extended or adjusted under 35 U.S.C. 154(b) by 21 days.

(21) Appl. No.: 18/433,375

(22) Filed: Feb. 5, 2024

(65) Prior Publication Data

US 2024/0322567 A1 Sep. 26, 2024

Related U.S. Application Data

(63) Continuation-in-part of application No. PCT/CN2023/138253, filed on Dec. 12, 2023.

(30) Foreign Application Priority Data

Mar. 24, 2023 (CN) .......................... 202310300248.9

(51) Int. Cl.
*H02J 3/01* (2006.01)
*H02J 3/26* (2006.01)

(52) U.S. Cl.
CPC . *H02J 3/01* (2013.01); *H02J 3/26* (2013.01)

(58) Field of Classification Search
CPC ...................................... H02J 3/01; H02J 3/26
USPC ......................................................... 307/105
See application file for complete search history.

(56) References Cited

FOREIGN PATENT DOCUMENTS

| CN | 103324791 | * | 9/2013 |
| CN | 103324791 A | * | 9/2013 |
| CN | 113555878 | * | 10/2021 |
| CN | 113555878 A | * | 10/2021 |

* cited by examiner

*Primary Examiner* — Hal Kaplan

(57) ABSTRACT

Disclosed are an electric power quality control method and device for an oil production platform, and a storage medium. The method includes: obtaining test data of electrical loads of power distribution rooms of an oil production platform, and determining electric power quality index data of each power distribution room based on the data; determining a power distribution room with an electric power quality problem based on the electric power quality index data and a preset index range; configuring a corresponding compensation scheme based on each electric power quality problem of the power distribution room with the electric power quality problem, the compensation scheme including a compensation device and a compensation capacity; and determining, based on the compensation device and capacity, functional and economic index data corresponding to each compensation device, and performing electric power quality control on the oil production platform based on the functional and economic index data.

20 Claims, 10 Drawing Sheets

Electric power quality control device for an oil production platform

- 301 Electric power quality obtaining module
- 302 Electric power quality analysis module
- 303 Compensation scheme configuration module
- 304 Electric power quality control module

ELECTRIC POWER QUALITY CONTROL METHOD AND DEVICE FOR OIL PRODUCTION PLATFORM, AND STORAGE MEDIUM

CROSS REFERENCE TO RELATED APPLICATIONS

The present application is a Continuation-In-Part Application of PCT Application No. PCT/CN2023/138253 filed on Dec. 12, 2023, which claims the benefit of Chinese Patent Application No. 202310300248.9 filed on Mar. 24, 2023. All the above are hereby incorporated by reference in their entirety.

TECHNICAL FIELD

The present disclosure relates to the technical field of electric power quality management and control, and in particular, to an electric power quality control method and device for an oil production platform, and a storage medium.

BACKGROUND

In related technologies, most oil production platforms, such as an offshore oil production platform, use a self-generating and self-consuming power supply technology, which has high energy consumption and heavy pollution. In order to resolve this problem, taking the offshore oil production platform as an example, power is supplied to the offshore oil production platform through an onshore power grid by using a submarine cable. This effectively reduces floor area occupied by an equipment layer of the platform, greatly reduces a cost of the offshore platform, realizes "electricity for oil and gas", increases a platform production, improves an economic benefit, effectively improves an operating environment of the offshore platform, and reduces pollutant emissions.

However, a power distribution network of the offshore oil production platform generally has a small capacity. Common electrical loads such as an oil well, a water injection pump, and an oil transfer pump are densely distributed on the platform, and are concentrated on large-capacity induction motor-type equipment. As a result, operation of the power distribution network of the oil production platform is greatly affected by the loads, and non-linear power electronic equipment and motor group equipment cause typical electric power quality problems such as a reduced power factor, high voltage and current harmonics, three-phase imbalance, and a voltage sag during equipment startup or short-circuit failure to the oil production platform. The above electric power quality problems reduce operating efficiency and a service life of a motor, which increases an energy consumption of the platform and reduces production efficiency of the platform, thereby ultimately affecting the economic benefit of the oil production platform. Therefore, it is necessary to propose a governance scheme to improve electric power quality of the offshore oil production platform.

Generally, the governance scheme for the electric power quality of the oil production platform adopts centralized compensation. For example, a capacitor compensation cabinet or a static var generator (SVG) is selected based on a power factor of the platform for governance. However, the centralized compensation may cause some problems. For example, although having a good effect in resolving a harmonic problem of the platform, the centralized compensation has a poor effect in resolving a voltage sag problem of the platform, thus limiting a governance effect of the electric power quality of the oil production platform. Therefore, how to further improve the governance effect of the electric power quality of the oil production platform has become an urgent problem to be resolved.

SUMMARY

In order to overcome existing problems in related technologies, embodiments of the present disclosure provide an electric power quality control method and device for an oil production platform, and a storage medium, which can resolve a problem of a limited governance effect of electric power quality of an oil production platform and improve a governance effect of the electric power quality of the oil production platform.

The present disclosure is implemented by following technical solutions.

According to a first aspect, an embodiment of the present disclosure provides an electric power quality control method for an oil production platform, including:
  obtaining test data of electrical loads of a plurality of power distribution rooms of an oil production platform, and determining electric power quality index data of each power distribution room of the oil production platform based on the test data of the electrical loads;
  determining a power distribution room with an electric power quality problem based on the electric power quality index data of each power distribution room and a preset index range;
  configuring a corresponding compensation scheme based on each electric power quality problem of the power distribution room with the electric power quality problem, where the compensation scheme includes a compensation device and a compensation capacity; and
  determining, based on the compensation device and the compensation capacity, functional index data and economic index data that are corresponding to each compensation device, and performing electric power quality control on the oil production platform based on the functional index data and the economic index data.

In a possible implementation of the first aspect, the configuring a corresponding compensation scheme based on each electric power quality problem of the power distribution room with the electric power quality problem includes:
  if the electric power quality problem is a reactive power problem, configuring the compensation device to include a static var generator (SVG) and a capacitor compensation cabinet, and determining compensation capacities of the SVG and the capacitor compensation cabinet based on maximum active power, a power factor before compensation, and a power factor after the compensation of a load in the corresponding power distribution room;
  if the electric power quality problem is a harmonic problem, configuring the compensation device to include an active power filter (APF), and determining a compensation capacity of the APF based on a fundamental current, a harmonic current, and a total harmonic distortion of current of an incoming line of the power distribution room; or
  if the electric power quality problem is a voltage sag problem, configuring the compensation device to include a dynamic voltage restorer (DVR), and determining a compensation capacity of the DVR based on a load-side current before a voltage sag, a load-side voltage before the voltage sag, and a load-side voltage after the voltage sag.

In a possible implementation of the first aspect, the determining compensation capacities of the SVG and the capacitor compensation cabinet based on maximum active power, a power factor before compensation, and a power factor after the compensation of a load in the corresponding power distribution room includes:

according to a following expression:

$$S_1 = P_1(\tan(\arccos \phi_1) - \tan(\arccos \phi_2))$$

determining the compensation capacities $S_1$ of the SVG and the capacitor compensation cabinet, where $P_1$ represents the maximum active power of the load in the corresponding power distribution room; $\cos \phi_1$ represents the power factor before the compensation of the load in the corresponding power distribution room; and $\cos \phi_2$ represents the power factor after the compensation of the load in the corresponding power distribution room;

the determining a compensation capacity of the APF based on a fundamental current, a harmonic current, and a total harmonic distortion of current of an incoming line of the power distribution room includes:

according to a following expression:

$$S_2 = I_h = I_{rms} \times THD_i$$

determining the compensation capacity $S_2$ of the APF, where $I_{rms}$ represents an effective value of the fundamental current of the incoming line of the power distribution room; $I_h$ represents the harmonic current; and $THD_i$ represents the total harmonic distortion of current, where i represents an $i^{th}$ power distribution room, i=1, ..., n, and n is an integer; and the determining a compensation capacity of the DVR based on a load-side current before a voltage sag, a load-side voltage before the voltage sag, and a load-side voltage after the voltage sag includes:

according to a following expression:

$$S_3 = I_L(\cos \theta + j \sin \theta)(U_L - U_{sag})$$

determining the compensation capacity $S_3$ of the DVR, where $I_L$ represents the load-side current before the voltage sag; $U_L$ represents the load-side voltage before the voltage sag; $U_{sag}$ represents the load-side voltage after the voltage sag; $\theta$ represents a load-side power factor angle before the voltage sag; and j represents an imaginary unit.

In a possible implementation of the first aspect, the determining, based on the compensation device and the compensation capacity, functional index data and economic index data that are corresponding to each compensation device includes:

obtaining a price per unit capacity of each compensation device, and determining a function coefficient of each compensation device; and obtaining, based on the function coefficient and a compensation capacity of each compensation device, the functional index data corresponding to each compensation device, and obtaining, based on the price per unit capacity and the compensation capacity of each compensation device, the economic index data corresponding to each compensation device.

In a possible implementation of the first aspect, the obtaining, based on the function coefficient and a compensation capacity of each compensation device, the functional index data corresponding to each compensation device includes:

if the compensation device comprises an SVG and a capacitor compensation cabinet, according to a following expression:

$$F_{1i} = \lambda_1 k_i S_{1i} + \lambda_2 S_{1i}(1 - k_i)$$

obtaining functional index data $F_{1i}$ corresponding to the SVG and the capacitor compensation cabinet in an $i^{th}$ power distribution room;

if the compensation device includes an APF, according to a following expression:

$$F_{2i} = \lambda_3 S_{2i}$$

obtaining functional index data $F_{2i}$ of the APF in the $i^{th}$ power distribution room; or if the compensation device includes a DVR, according to a following expression:

$$F_{3i} = \lambda_4 S_{3i}$$

obtaining functional index data $F_{3i}$ of the DVR in the $i^{th}$ power distribution room, where i represents the $i^{th}$ power distribution room, i=1, ..., n, and n is an integer; $\lambda_1$ represents a function coefficient of the capacitor compensation cabinet, $\lambda_2$ represents a function coefficient of the SVG, $\lambda_3$ represents a function coefficient of the APF, and $\lambda_4$ represents a function coefficient of the DVR; $k_i$ represents a configuration ratio of the capacitor compensation cabinet, and $1-k_i$ represents a configuration ratio of the SVG; and $S_{1i}$ represents compensation capacities of the SVG and the capacitor compensation cabinet in the $i^{th}$ power distribution room, $S_{2i}$ represents a compensation capacity of the APF in the $i^{th}$ power distribution room, and $S_{3i}$ represents a compensation capacity of the DVR in the $i^{th}$ power distribution room; and the obtaining, based on the price per unit capacity and the compensation capacity of each compensation device, the economic index data corresponding to each compensation device includes:

if the compensation device includes the SVG and the capacitor compensation cabinet, according to a following expression:

$$R_{1i} = P_1 S_{1i} + P_2 S_{1i}(1 - k_i)$$

obtaining economic index data $R_{1i}$ corresponding to the SVG and the capacitor compensation cabinet in the $i^{th}$ power distribution room;

if the compensation device includes the APF, according to a following expression:

$$R_{2i} = P_3 S_{2i}$$

obtaining economic index data $R_{2i}$ of the APF in the $i^{th}$ power distribution room; or if the compensation device includes the DVR, according to a following expression:

$$R_{3i}=P_4 S_{3i}$$

obtaining economic index data $R_{3i}$ of the DVR in the $i^{th}$ power distribution room;

where $P_1$ represents a price per unit capacity of the capacitor compensation cabinet; $P_2$ represents a price per unit capacity of the SVG; $P_3$ represents a price per unit capacity of the APF; and $P_4$ represents a price per unit capacity of the DVR.

In a possible implementation of the first aspect, the performing electric power quality control on the oil production platform based on the functional index data and the economic index data includes:

obtaining an optimization mode of the compensation scheme based on a governance requirement, and configuring a function weight and an economic weight;

normalizing functional index data and economic index data of to-be-compared different compensation schemes separately to eliminate dimensions and ensure objectivity in comparing various indexes, where expressions for the normalization are as follows:

$$\begin{cases} F'_{ki} = \dfrac{F_{ki}}{\sum_{i=1}^{n}(F_{1i}+F_{2i}+F_{3i})} \\ R'_{ki} = \dfrac{R_{ki}}{\sum_{i=1}^{n}(R_{1i}+R_{2i}+R_{3i})} \end{cases}$$

where k=1, 2, or 3; $F_{1i}$ represents functional index data corresponding to an SVG and a capacitor compensation cabinet, $F_{2i}$ represents functional index data of an APF, and $F_{3i}$ represents functional index data of a DVR; $R_{1i}$ represents economic index data corresponding to the SVG and the capacitor compensation cabinet, $R_{2i}$ represents economic index data of the APF, and $R_{3i}$ represents economic index data of the DVR; i represents an $i^{th}$ power distribution room, where i=1, . . . , n, and n is an integer representing a total quantity of power distribution rooms; and $F'_{ki}$ and $R'_{ki}$ respectively represent corresponding normalized functional index data and normalized economic index data;

determining an expression of a comprehensive evaluation index $C_i$ of the power distribution room based on the normalized functional index data, the normalized economic index data, the function weight, and the economic weight:

$$C_i = \alpha(F'_{1i}+F'_{2i}+F'_{3i}) + \beta \dfrac{1}{R'_{1i}+R'_{2i}+R'_{3i}}$$

calculating a comprehensive evaluation index $C_i$ of each compensation scheme under the optimization mode according to the expression, where $\alpha$ represents the function weight, and $\beta$ represents the economic weight; and selecting a compensation scheme with a largest value of the comprehensive evaluation index $C_i$ as an optimal scheme under the optimization mode, and performing the electric power quality control on the oil production platform based on the optimal scheme.

In a possible implementation of the first aspect, the optimization mode includes a first mode, a second mode, and a third mode, and the first mode, the second mode, and the third mode are different; and the obtaining an optimization mode of the compensation scheme based on a governance requirement, and configuring a function weight and an economic weight includes:

if the optimization mode obtained for the compensation scheme based on the governance requirement is the first mode, setting the function weight to be greater than the economic weight;

if the optimization mode obtained for the compensation scheme based on the governance requirement is the second mode, setting the function weight to be less than the economic weight; or if the optimization mode obtained for the compensation scheme based on the governance requirement is the third mode, setting the function weight to be equal the economic weight.

According to a second aspect, an embodiment of the present disclosure provides an electric power quality control device for an oil production platform, including:

an electric power quality obtaining module configured to obtain test data of electrical loads of a plurality of power distribution rooms of an oil production platform, and determine electric power quality index data of each power distribution room of the oil production platform based on the test data of the electrical loads;

an electric power quality analysis module configured to determine a power distribution room with an electric power quality problem based on the electric power quality index data of each power distribution room and a preset index range;

a compensation scheme configuration module configured to configure a corresponding compensation scheme based on each electric power quality problem of the power distribution room with the electric power quality problem, where the compensation scheme includes a compensation device and a compensation capacity; and an electric power quality control module configured to determine, based on the compensation device and the compensation capacity, functional index data and economic index data that are corresponding to each compensation device, and perform electric power quality control on the oil production platform based on the functional index data and the economic index data.

According to a third aspect, an embodiment of the present disclosure provides a computing device, including a memory and a processor, where the memory stores a computer program executable on the processor, and the computer program is executed by the processor to implement the electric power quality control method for an oil production platform in any one of the implementations of the first aspect.

According to a fourth aspect, an embodiment of the present disclosure provides a computer-readable storage medium, where the computer-readable storage medium stores a computer program, and the computer program is executed by a processor to implement the electric power quality control method for an oil production platform in any one of the implementations of the first aspect.

Compared with the prior art, the embodiments of the present disclosure have following beneficial effects:

In the embodiments of the present disclosure, a corresponding compensation scheme is configured for each electric power quality problem of a power distribution room with an electric power quality problem, in other words, different compensation schemes are provided for different problems, which can resolve various electric power quality problems and reduce effect limitations of electric power quality governance of an oil production platform. Moreover, the embodiments also consider functional and economic indexes of the compensation scheme, considering both economic efficiency and functionality of the electric power quality governance of the oil production platform. Therefore, a more suitable governance scheme can be selected to improve an effect of the electric power quality governance of the oil production platform.

For beneficial effects of the second aspect to the fourth aspect, reference may be made to the beneficial effects of the first aspect. Details are not described herein again.

It should be understood that the above general description and the following detailed description are only exemplary and explanatory, and should not be construed as a limitation to the present disclosure.

BRIEF DESCRIPTION OF THE DRAWINGS

To describe the technical solutions in the embodiments of the present disclosure more clearly, the accompanying drawings required for describing the embodiments or the prior art are described briefly below. Apparently, the accompanying drawings in the following description merely show some embodiments of the present disclosure, and those of ordinary skill in the art may still derive other accompanying drawings from these accompanying drawings without creative efforts.

FIG. 4 is schematic structural diagram of an electric power quality control device for an oil production platform according to an embodiment of the present disclosure;

DETAILED DESCRIPTION

Figure 1:
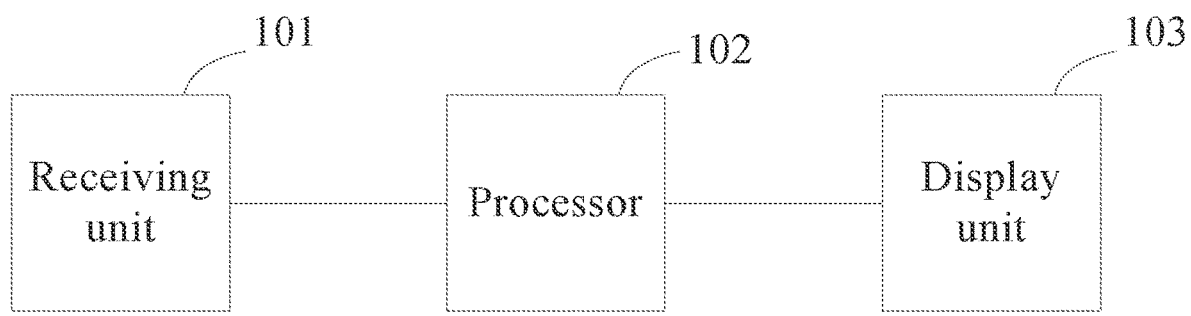
FIG. 1 is a schematic diagram of an architecture of an electric power quality control system for an oil production platform according to an embodiment of the present disclosure.

In the following description, specific details such as a specific system structure and a technology are provided for description instead of limitation, to thoroughly understand embodiments of the present disclosure. However, those skilled in the art should understand that the present disclosure may also be implemented in other embodiments without these specific details. In other cases, detailed descriptions of a well-known system, apparatus, circuit, and method are omitted to avoid unnecessary details interfering with the description of the present disclosure.

It should be understood that when used in this specification of the present disclosure and the appended claims, the terms "comprise" and "include" indicate the presence of described features, integers, steps, operations, elements and/or components, but do not exclude the presence or addition of one or more of other features, integers, steps, operations, elements, components, and/or sets thereof.

It should also be understood that the term "and/or" used in this specification of the present disclosure and the appended claims refers to one or any or all possible combinations of a plurality of associated items that are listed, and includes these combinations.

As used in this specification of the present disclosure and the appended claims, the term "if" can be interpreted as "when" or "once" or "in response to a determination" or "in response to a detection" according to the context. Similarly, the phrase "if [the described condition or event] is determined" or "if [the described condition or event] is detected" can be interpreted as "once [the described condition or event] is determined" or "in response to the determination of [the described condition or event]" or "once [the described condition or event] is detected" or "in response to the detection of [the described condition or event]" according to the context.

In addition, in the description of this specification of the present disclosure and the appended claims, the terms such as "first", "second", and "third" are used only for distinguishing, rather than to indicate or imply relative importance.

The reference to "one embodiment" or "some embodiments" described in this specification of the present disclosure means that a specific feature, structure, or characteristic described in combination with the embodiment is included in at least one embodiment of the present disclosure. Therefore, the statements "in one embodiment", "in some embodiments", "in other embodiments", and the like that appear differently in this specification do not necessarily refer to a same embodiment, but mean "at least one embodiment instead of all embodiments", unless otherwise emphasized. The terms "comprise", "include", "contain", "have", and their variations all mean "including but not limited to", unless otherwise emphasized.

In related technologies, electric power quality of an oil production platform is usually governed through centralized compensation, which may cause some problems. For example, the centralized compensation has a good effect in resolving a harmonic problem of the platform, but has a poor effect in resolving a voltage sag problem of the platform, thus limiting a governance effect of the electric power quality of the oil production platform.

To resolve the above problems, the embodiments of the present disclosure provide an electric power quality control method for an oil production platform. A corresponding compensation scheme is configured for each electric power quality problem of a power distribution room with an electric power quality problem. Moreover, functional and economic indexes of the compensation scheme are also considered. This reduces effect limitations of electric power quality governance of an oil production platform while resolving various electric power quality problems of the oil production platform. In addition, both economical efficiency and functionality of an electric power quality governance scheme of the oil production platform are considered, thereby improving an effect of the electric power quality governance of the oil production platform.

For example, the present disclosure provides an electric power quality control method for an oil production platform, which is applicable to an electric power quality control system for an oil production platform shown in FIG. 1. In FIG. 1, the system may include a receiving unit 101, a processor 102, and a display unit 103.

In a specific implementation process, the receiving unit 101 may be an input/output interface or a communication interface, and can be configured to receive test data information of electrical loads of a plurality of power distribution rooms of an oil production platform.

The processor 102 can obtain the test data information of the electrical loads of the power distribution rooms of the oil production platform through the receiving unit 101, and then configure a corresponding compensation scheme for each electric power quality problem of a power distribution room with an electric power quality problem. Moreover, functional and economic indexes of the compensation scheme are considered, thereby considering both economical efficiency and functionality of an electric power quality governance scheme of the oil production platform. In the embodiments, different compensation schemes are provided for different problems. This can resolve various electric power quality problems, reduce effect limitations of electric power quality governance of the oil production platform, considers both the economical efficiency and the functionality of the electric power quality governance scheme of the oil production platform, thereby further improving an effect of the electric power quality governance of the oil production platform.

The display unit 103 can be configured to display the compensation scheme, the functional index, the economic index, etc.

The display unit may also be a touch screen, configured to receive a user instruction while displaying the above content, in order to achieve interaction with a user.

In addition, the system architecture described in the embodiments of the present disclosure is only used to more clearly describe the technical solutions in the embodiments of the present disclosure, and does not constitute a limitation to the technical solutions in the embodiments of the present disclosure. A person of ordinary skill in the art may understand that, with evolution of the system architecture and emergence of a new service scenario, the technical solutions provided in the embodiments of the present disclosure are also applicable to a similar technical problem.

To enable those skilled in the art to better understand the solutions in the present disclosure, the technical solutions in the embodiments of the present disclosure will be clearly and completely described below with reference to the accompanying drawings and specific implementations. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Figure 2:
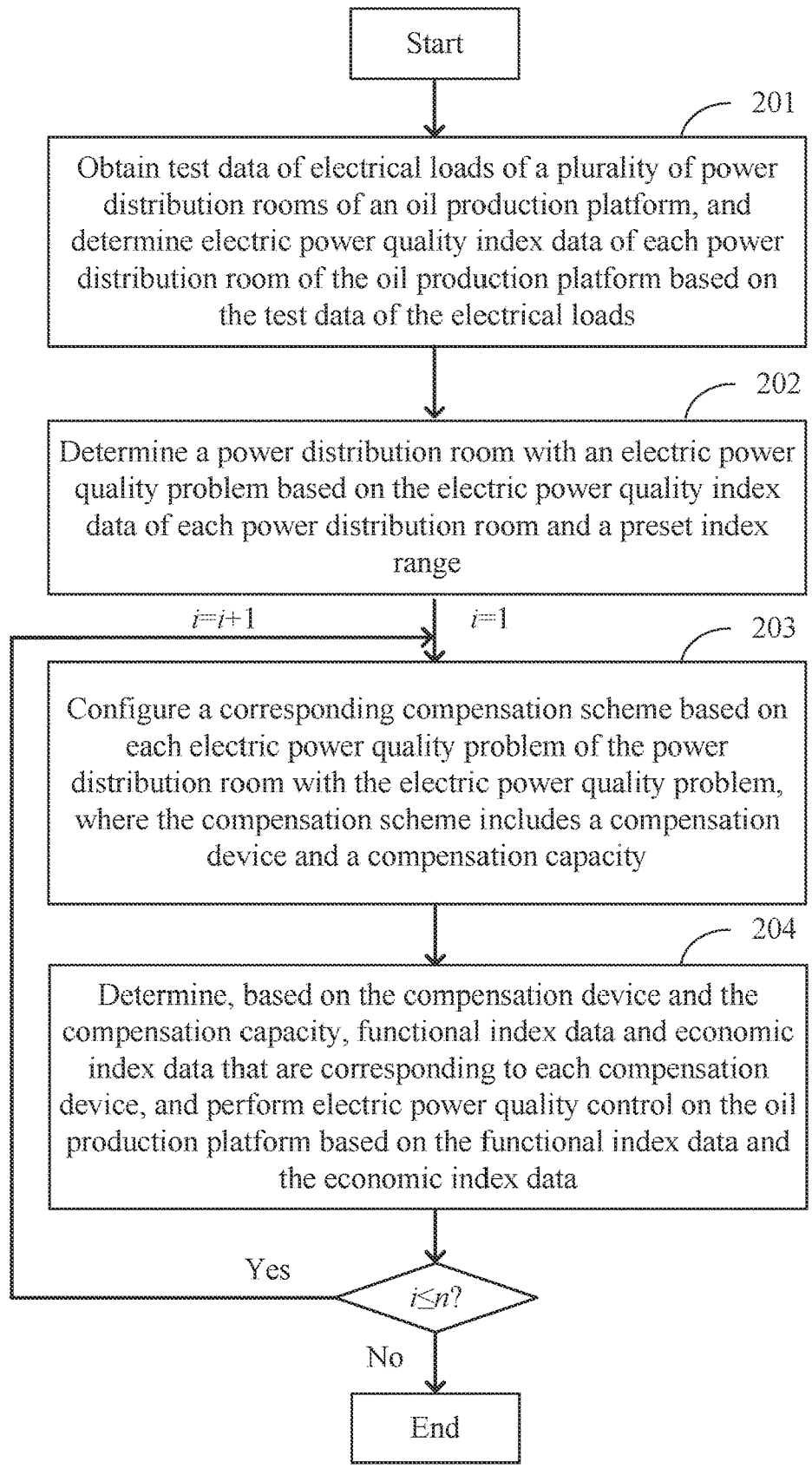
FIG. 2 is a schematic flowchart of an electric power quality control method for an oil production platform according to an embodiment of the present disclosure.

Referring to FIG. 2, the electric power quality control method for an oil production platform in the present disclosure is detailed below.

An electric power quality control method for an oil production platform is used for an oil production platform containing a plurality of power distribution rooms, and includes following steps:

Step 201: Obtain test data of electrical loads of the power distribution rooms of the oil production platform, and determine electric power quality index data of each power distribution room of the oil production platform based on the test data of the electrical loads.

The test data of the electrical loads may be on-site measured data of the power distribution rooms, including voltage, current, and other test data.

For example, in this embodiment, electric power quality indexes can be calculated based on the test data of the electrical loads, including a power factor, a harmonic, a voltage sag, a voltage deviation, a three-phase voltage unbalance factor, a three-phase current unbalance factor, and the like.

Step 202: Determine a power distribution room with an electric power quality problem based on the electric power quality index data of each power distribution room and a preset index range.

In this embodiment, whether the electric power quality index data of each power distribution room of the oil production platform exceeds the preset index range can be determined based on the electric power quality index data. If each electric power quality index of a power distribution room is within the preset index range, it can be confirmed that the power distribution room has no electric power quality problem, and no additional governance is required. Therefore, there is no need to configure a compensation scheme for the power distribution room. If each electric power quality index of a power distribution room exceeds the preset index range, electric power quality of the power distribution room does not meet a standard, and it is confirmed that the power distribution room has an electric power quality problem. This embodiment can perform layer-based optimization for a specific electric power quality problem, for example, provide different compensation schemes for different power governance problems, and perform region-based and layer-based optimization and governance on the power distribution room.

In this embodiment, electric power quality analysis is performed on the power distribution room in combination with on-site measured data of an actual oil production platform. It is confirmed that the power distribution room has the electric power quality problem, overall electric power quality of the oil production platform is obtained, and a degree to which the electric power quality index data of each power distribution room of the oil production platform exceeds the preset index range is calculated. Based on the degree to which the electric power quality index data exceeds the preset index range, the region-based and layer-based optimization and governance are performed for the specific electric power quality problem. The preset index range may be determined based on electric power quality index data during normal operation of the power distribution rooms, and for example, is set to an average value of the electric power quality index data during the normal operation of the power distribution rooms.

Step 203: Configure a corresponding compensation scheme based on each electric power quality problem of the power distribution room with the electric power quality problem, where the compensation scheme includes a compensation device and a compensation capacity.

For example, this embodiment proposes the corresponding compensation scheme for the power distribution room with the electric power quality problem based on electric power quality of the power distribution room. That is, in a process of configuring a scheme for a single power distribution room, a region-based optimization mode is used for a specific power distribution room. After scheme configuration of an $i^{th}$ (i=1 . . . n, where n is an integer) power distribution room is analyzed, a governance scheme for an $(i+1)^{th}$ power distribution room is analyzed until governance schemes for the n power distribution rooms are completed.

Optionally, in the step 203, the configuring a corresponding compensation scheme based on each electric power quality problem of the power distribution room with the electric power quality problem includes: if the electric power quality problem is a reactive power problem, configuring the compensation device to include an SVG and a capacitor compensation cabinet, and determining compensation capacities of the SVG and the capacitor compensation cabinet based on maximum active power, a power factor before compensation, and a power factor after the compensation of a load in the corresponding power distribution room; if the electric power quality problem is a harmonic problem, configuring the compensation device to include an APF, and determining a compensation capacity of the APF based on a fundamental current, a harmonic current, and a total harmonic distortion of current of an incoming line of the power distribution room; or if the electric power quality problem is a voltage sag problem, configuring the compensation device to include a DVR, and determining a compensation capacity of the DVR based on a load-side current before a voltage sag, a load-side voltage before the voltage sag, and a load-side voltage after the voltage sag.

For example, typical problems of the oil production platform include the reactive power compensation problem, the harmonic problem, and the voltage sag problem. The step 203 mainly focuses on three-level electric power quality problems: the reactive power compensation problem, the harmonic problem, and the voltage sag problem. In addition, a governance device can also consider problems such as voltage/current imbalance and a voltage deviation. The voltage sag problem is mainly addressed in a decentralized manner by using the DVR. The reactive power compensation problem is mainly addressed in a hybrid manner by using the SVG and the capacitor compensation cabinet. The harmonic problem is mainly addressed in a centralized manner by using the APF.

In an embodiment, the reactive power compensation problem, the harmonic problem, and the voltage sag problem are addressed mainly by the compensation device. The compensation device is the governance device. Therefore, when each electric power quality index of each power distribution room of the oil production platform exceeds the preset index range, the compensation device can be directly used to govern the power distribution room.

Specifically, in this embodiment, the compensation capacities of the SVG and the capacitor compensation cabinet can be determined based on the maximum active power, the power factor before compensation, and the power factor after the compensation of the load in the corresponding power distribution room. For example, according to a following expression:

$$S_1 = P_1(\tan(\arccos \phi_1) - \tan(\arccos \phi_2)) \quad (1)$$

the compensation capacities $S_1$ of the SVG and the capacitor compensation cabinet are determined, where $P_1$ represents the maximum active power of the load in the corresponding power distribution room; $\cos \phi_1$ represents the power factor before the compensation of the load in the corresponding power distribution room; and $\cos \phi_2$ represents the power factor after the compensation of the load in the corresponding power distribution room. The power factor after the compensation is a target power factor that meets a standard requirement.

For example, the power factor before the compensation is equal to active power of a tested power distribution room divided by total apparent power. The power factor after the compensation may be a specified value. That is, as required, the power factor after the compensation reaches a certain value, and usually meets a following requirement: $1 > \cos \phi_2 > \cos \phi_1$.

In this embodiment, the compensation capacity of the APF can also be determined based on the fundamental current, the harmonic current, and the total harmonic distortion of current of the incoming line of the power distribution room. For example, according to a following expression:

$$S_2 = I_h = I_{rms} \times THD_i \quad (2)$$

the compensation capacity $S_2$ of the APF is determined, where $I_{rms}$ represents an effective value of the fundamental current of the incoming line of the power distribution room; $I_h$ represents the harmonic current; and $THD_i$ represents the total harmonic distortion of current. The APF is used to compensate for the harmonic current. Actually, when a compensation current is determined, it means that the compensation capacity is determined. Therefore, in the present disclosure, the $S_2$ is used to represent a capacity of the APF for unified representation.

In addition, in this embodiment, the compensation capacity of the DVR can also be determined based on the load-side current before the voltage sag, the load-side voltage before the voltage sag, and the load-side voltage after the voltage sag. For example, according to a following expression:

$$S_3 = I_L(\cos \theta + j \sin \theta)(U_L - U_{sag}) \quad (3)$$

the compensation capacity $S_3$ of the DVR is determined, where $I_L$ represents the load-side current before the voltage sag; $I_L$ represents the load-side voltage before the voltage sag; $U_{sag}$ represents the load-side voltage after the voltage sag; $\theta$ represents a load-side power factor angle before the voltage sag; and j represents an imaginary unit. The load-side power factor angle is an included angle between a load-side voltage phasor and a load-side current phasor, and $\theta = <U_L, I_L>$.

Herein, a region-based and layer-based compensation scheme in this embodiment is used to govern a region of a specific power distribution room of a specific offshore oil production platform, to address the electric power quality problems more thoroughly.

Step 204: Determine, based on the compensation device and the compensation capacity, functional index data and economic index data that are corresponding to each compensation device, and perform electric power quality control on the oil production platform based on the functional index data and the economic index data.

A purpose of determining functionality and economical efficiency is to perform optimization separately based on an effect of a governance scheme of the platform and an investment cost. In the step 204, functional index data and economic index data of the capacitor compensation cabinet and the SVG, functional index data and economic index data of the APF, and functional index data and economic index data of the DVR are calculated based on the reactive power compensation problem, the harmonic problem, and the voltage sag problem respectively.

Specifically, in the step 204, the determining, based on the compensation device and the compensation capacity, functional index data and economic index data that are corresponding to each compensation device includes: obtaining a price per unit capacity of each compensation device, and determining a function coefficient of each compensation device; and obtaining, based on the function coefficient and a compensation capacity of each compensation device, the functional index data corresponding to each compensation device, and obtaining, based on the price per unit capacity and the compensation capacity of each compensation device, the economic index data corresponding to each compensation device.

For example, in this embodiment, the obtaining, based on the function coefficient and a compensation capacity of each compensation device, the functional index data corresponding to each compensation device includes following steps:

If the compensation device includes the SVG and the capacitor compensation cabinet, according to a following expression:

$$F_{1i} = \lambda_1 k_i S_{1i} + \lambda_2 S_{1i}(1 - k_i) \quad (4)$$

functional index data $F_{1i}$ corresponding to the SVG and the capacitor compensation cabinet in the $i^{th}$ power distribution room is obtained.

Herein, a compensation capacity for the reactive power problem is constituted by the compensation capacities of the SVG and the capacitor compensation cabinet. Capacitor equipment and the capacitor compensation cabinet have a low cost, and the SVG has a high cost but a good compensation effect. Therefore, in order to consider both the economical efficiency and a compensation effect, the SVG and the capacitor compensation cabinet are used for hybrid reactive power compensation. Based on the compensation capacities of the SVG and the capacitor compensation cabinet, configuration ratios of the capacitor compensation cabinet and SVG are set. The configuration ratio of the capacitor compensation cabinet may be set to $k_i$, and the configuration ratio of the SVG may be set to $1-k_i$. A sum of a compensation capacity of the capacitor compensation cabinet and the compensation capacity of the SVG should meet a requirement of a total compensation capacity. A specific configuration ratio will be determined in subsequent steps. Specifically, when the voltage sag problem occurs in the power distribution room, a certain proportion of SVGs must be configured in a reactive power compensation device to ensure that $k_i<1$.

If the compensation device includes the APF, according to a following expression:

$$F_{2i} = \lambda_3 S_{2i} \quad (5)$$

functional index data $F_{2i}$ of the APF in the $i^{th}$ power distribution room is obtained.

If the compensation device includes the DVR, according to a following expression:

$$F_{3i} = \lambda_4 S_{3i} \quad (6)$$

functional index data $F_{3i}$ of the DVR in the $i^{th}$ power distribution room is obtained. In the above expressions, i represents the $i^{th}$ power distribution room, where i=1, ..., n; $\lambda_1$ represents a function coefficient of the capacitor compensation cabinet, $\lambda_2$ represents a function coefficient of the SVG, $\lambda_3$ represents a function coefficient of the APF, and $\lambda_4$ represents a function coefficient of the DVR; $k_i$ represents the configuration ratio of the capacitor compensation cabinet; $1-k_i$ represents the configuration ratio of the SVG; and $S_{1i}$ represents compensation capacities of the SVG and the capacitor compensation cabinet in the $i^{th}$ power distribution room, $S_{2i}$ represents a compensation capacity of the AFP in the $i^{th}$ power distribution room, and $S_{3i}$ represents a compensation capacity of the DVR in the $i^{th}$ power distribution room.

In this embodiment, a functional index of the compensation device is a function coefficient defined for the device to comprehensively evaluate a governance effect and a function of the device. There are a plurality of governance schemes and different compensation devices have different functions. Therefore, in order to plan the governance effect and the economical efficiency as a whole, a function coefficient $\lambda$ is introduced. Specifically, the capacitor compensation cabinet and the DVR have single functions and their function coefficients $\lambda_1$ and $\lambda_4$ may be set to 1 by default. The SVG can compensate for a voltage while compensating for reactive power, and can also have a certain governance effect for the voltage sag problem. Therefore, the function coefficient $\lambda_2$ of the SVG may be typically set to 1.5. Similarly, the APF can also compensate for an imbalanced current while compensating for the harmonic current. Therefore, the function coefficient $\lambda_3$ of the APF may be typically set to 1.5.

Optionally, in this embodiment, the obtaining, based on the price per unit capacity and the compensation capacity of each compensation device, the economic index data corresponding to each compensation device includes following steps:

If the compensation device includes the SVG and the capacitor compensation cabinet, according to a following expression:

$$R_{1i} = P_1 S_{1i} + P_2 S_{1i}(1 - k_i) \quad (7)$$

economic index data $R_{1i}$ corresponding to the SVG and the capacitor compensation cabinet in the $i^{th}$ power distribution room is obtained.

If the compensation device includes the APF, according to a following expression:

$$R_{2i} = P_3 S_{2i} \quad (8)$$

economic index data $R_{2i}$ of the APF in the $i^{th}$ power distribution room is obtained.

If the compensation device includes the DVR, according to a following expression:

$$R_{3i} = P_4 S_{3i} \quad (9)$$

economic index data $R_{3i}$ of the DVR in the $i^{th}$ power distribution room is obtained.

In the above expression, $P_1$ represents a price per unit capacity of the capacitor compensation cabinet; $P_2$ represents a price per unit capacity of the SVG; $P_3$ represents a price per unit capacity of the APF; and $P_4$ represents a price per unit capacity of the DVR.

For example, this embodiment forms a plurality of preliminary compensation schemes based on the functional index data and the economic index data. Specifically, a preliminary harmonic compensation scheme is determined based on a harmonic current capacity of the APF, a preliminary voltage sag scheme is determined based on the compensation capacity of the DVR, and for the reactive power compensation, a preliminary reactive power compensation scheme is formed by setting a preset gradient of the configuration ratio $k_i$ of the capacitor compensation cabinet. The preliminary compensation schemes include the preliminary harmonic compensation scheme, the preliminary voltage sag scheme, and the preliminary reactive power compensation scheme.

Figure 6:
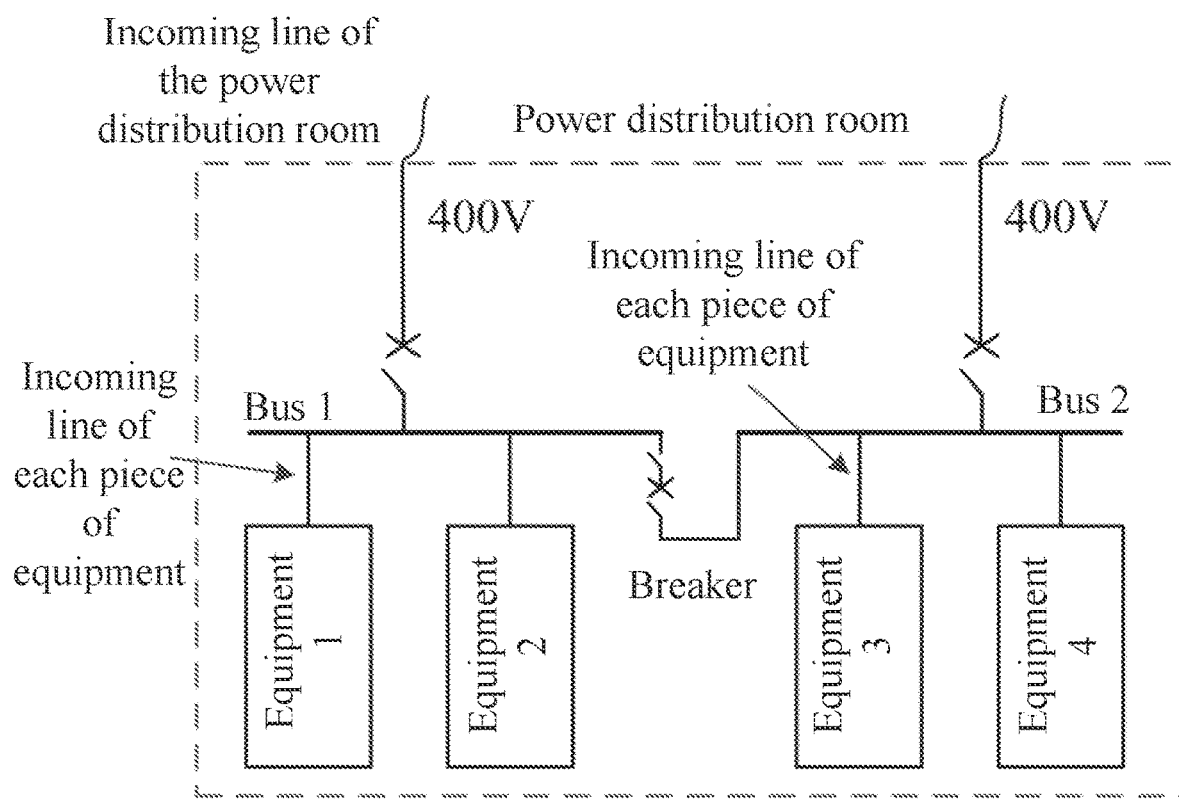
FIG. 6 is a schematic diagram of incoming lines of a power distribution room and an electrical equipment of an oil production platform according to an embodiment of the present disclosure.
Figure 7:
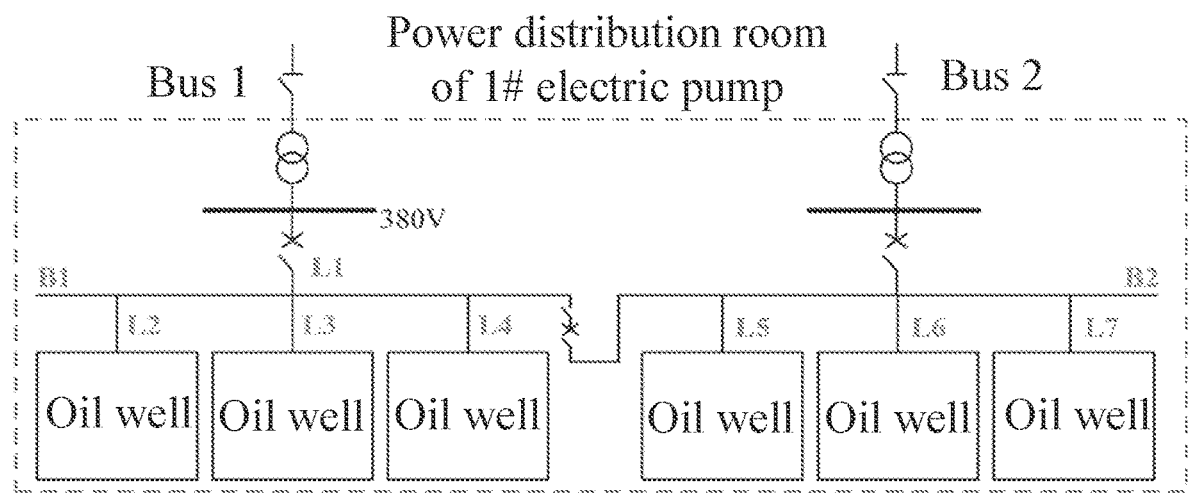
FIG. 7 is a topological graph of a first power distribution room of an oil production platform according to an embodiment of the present disclosure.
Figure 8:
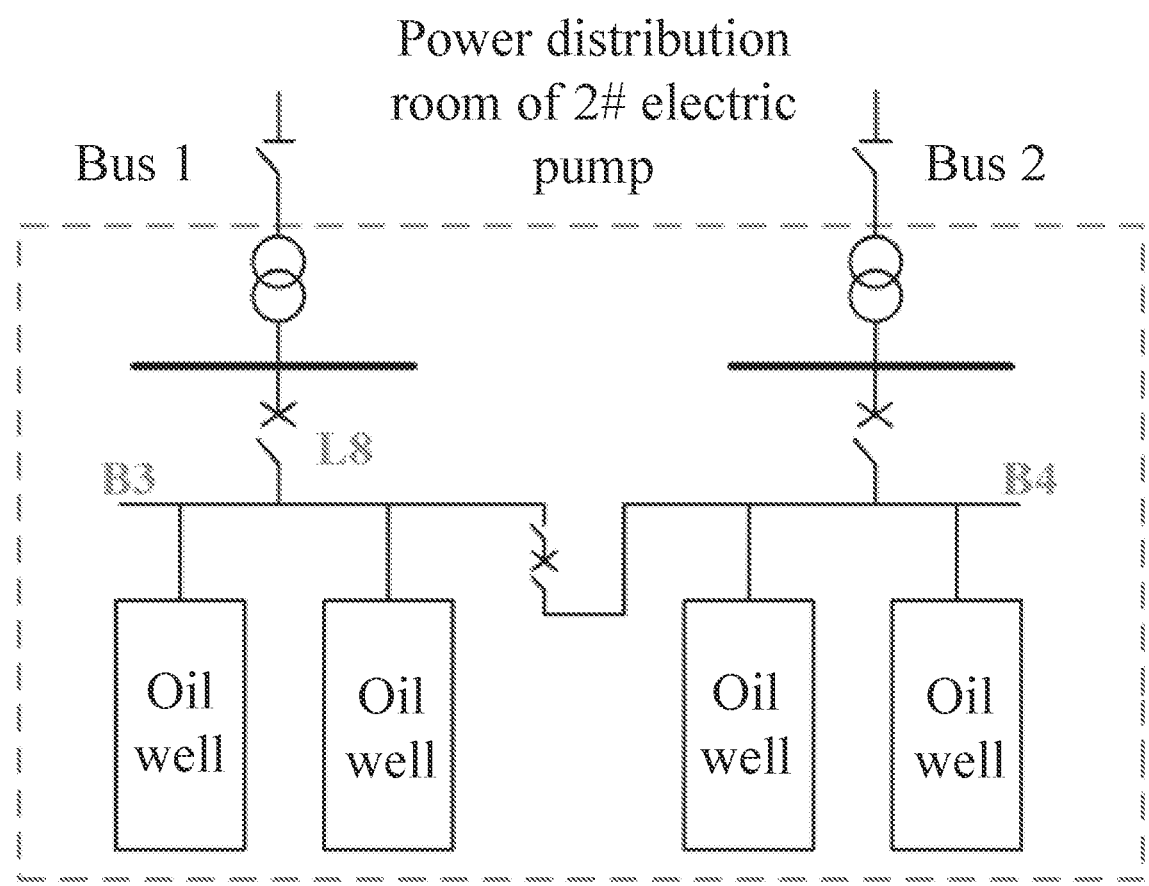
FIG. 8 is a topological graph of a second power distribution room of an oil production platform according to an embodiment of the present disclosure.
Figure 9:
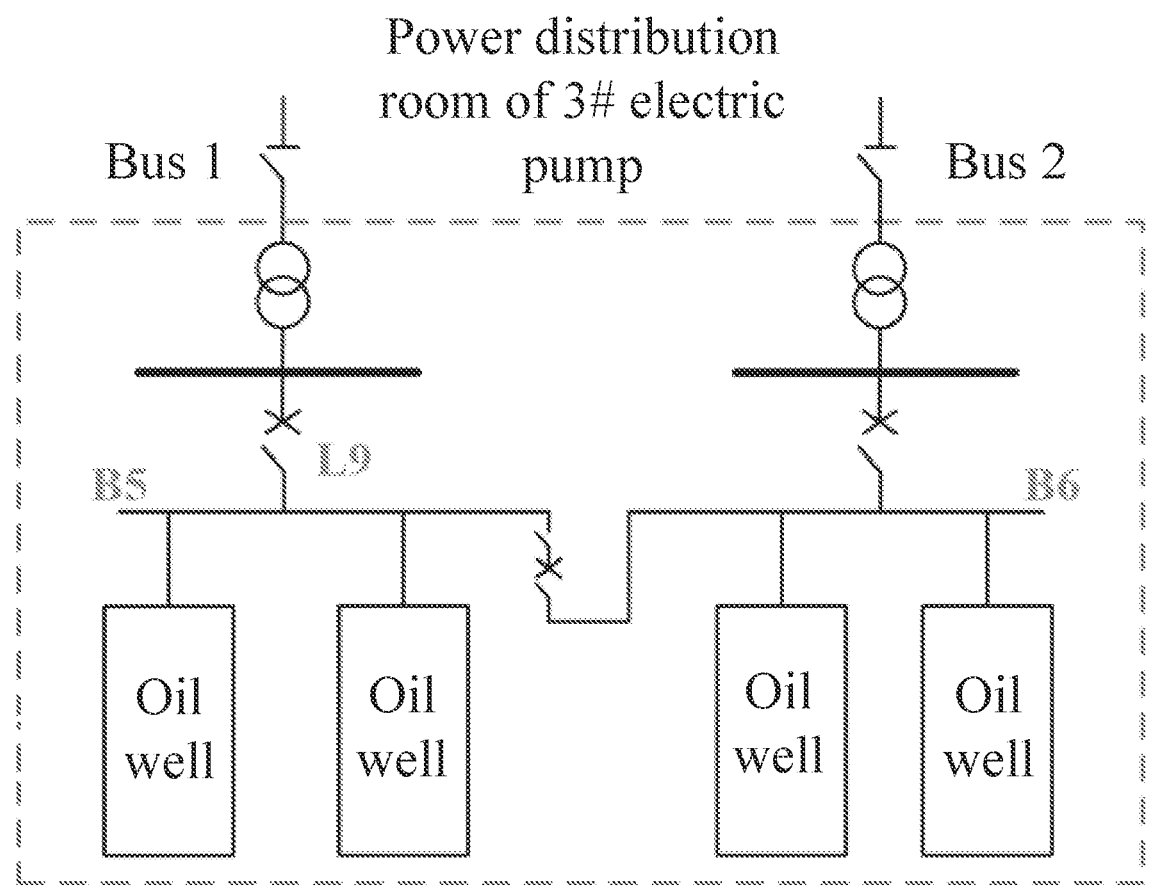
FIG. 9 is a topological graph of a third power distribution room of an oil production platform according to an embodiment of the present disclosure.
Figure 10:
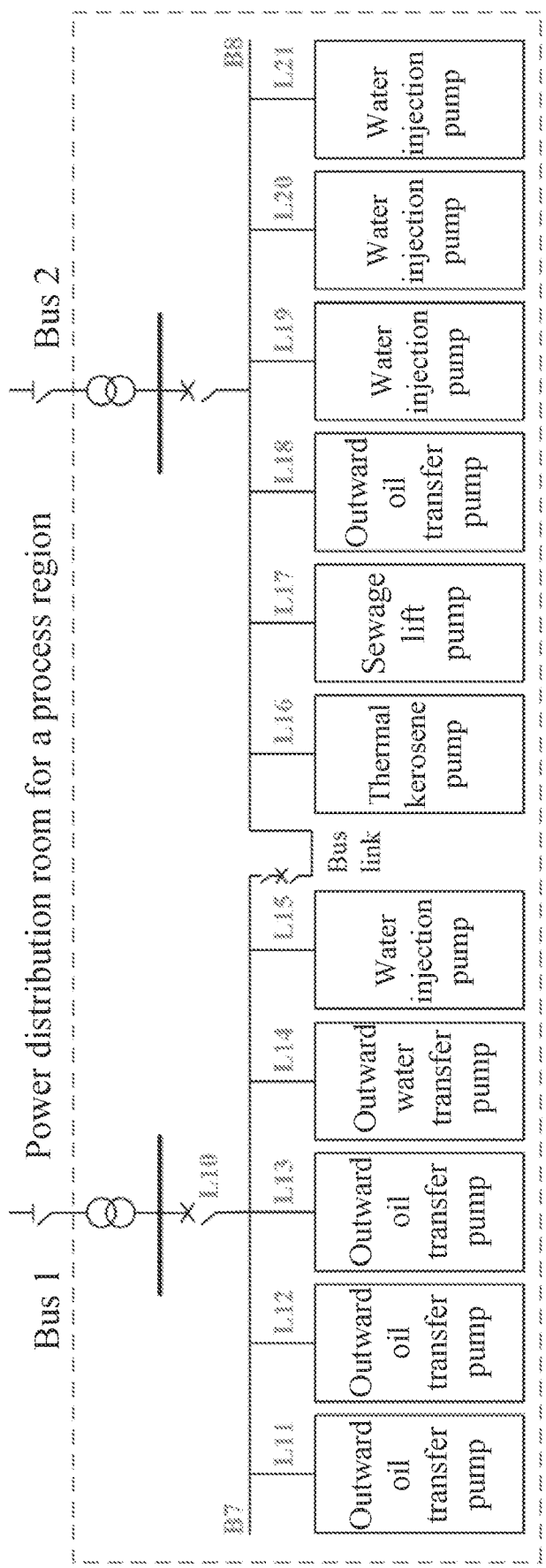
FIG. 10 is a topological graph of a fourth power distribution room of an oil production platform according to an embodiment of the present disclosure.

The preliminary harmonic compensation scheme is determined based on the harmonic current capacity of the APF and is centrally deployed at the incoming line of the power distribution room. The preliminary voltage sag scheme is determined based on the compensation capacity of the DVR and is decentralizedly deployed at an incoming line of to-be-compensated electrical equipment. A plurality of different schemes can be formed, as shown in FIG. 6. For the reactive power compensation, the configuration ratio $k_i$ of the capacitor compensation cabinet may be set based on a preset gradient of 0.1, such that different hybrid configuration schemes are formed.

In the above process, corresponding governance schemes are proposed for different typical electric power quality problems, achieving a more targeted governance effect. The hybrid compensation mode in which both the capacitor compensation cabinet and the SVG are used makes full use of advantages of a low cost of the capacitor and a good governance effect of the SVG, to maximize an effect and cost utilization.

In this embodiment, after the plurality of compensation schemes are preliminarily formed, a governance scheme optimization mode is determined. The functionality brings about the governance effect. The governance effect and the economic efficiency are allocated based on a weight, and are respectively defined as $\alpha$ and $\beta$. Three optimization modes correspond to different weights.

For example, in this embodiment, an optimization mode of the compensation scheme is obtained based on a governance requirement, and a function weight and an economic weight are configured. Specifically, if the optimization mode obtained for the compensation scheme based on the governance requirement is a first mode, the function weight is set to be greater than the economic weight. If the optimization mode obtained for the compensation scheme based on the governance requirement is a second mode, the function weight is set to be less than the economic weight. If the optimization mode obtained for the compensation scheme based on the governance requirement is the third mode, the function weight is set to be equal the economic weight.

For example, different optimization modes are selected for different governance requirements. The optimization mode includes the first mode, the second mode, and the third mode, and the first mode, the second mode, and the third mode are different. The first mode focuses on the governance effect. The second mode focuses on economical efficiency of an investment. The third mode balances the governance effect and the economical efficiency of the investment.

For example, in the first mode, $\alpha=0.7$, and $\beta=0.3$.
For example, in the second mode, $\alpha=0.3$, and $\beta=0.7$.
For example, in the third mode, $\alpha=\beta=0.5$.

An electric power quality governance scheme considers both the economical efficiency and the functionality. A specific optimization mode can be used to fully achieve a trade-off between the governance effect and the economical efficiency of the scheme to select a most suitable compensation scheme.

Optionally, in this embodiment, the performing electric power quality control on the oil production platform based on the functional index data and the economic index data includes: obtaining the optimization mode of the compensation scheme based on the governance requirement, and configuring the function weight and the economic weight. Particularly, in order to prevent dimensions of the functional index data and the economic index data from affecting an index analysis result, it is necessary to normalize the functional index data and the economic index data. Expressions for the normalization are as follows:

$$\begin{cases} F'_{ki} = \dfrac{F_{ki}}{\sum_{i=1}^{n}(F_{1i} + F_{2i} + F_{3i})} \\ R'_{ki} = \dfrac{R_{ki}}{\sum_{i=1}^{n}(R_{1i} + R_{2i} + R_{3i})} \end{cases} \quad (10)$$

In the above expressions, k=1, 2, or 3; $F_{1i}$ represents the functional index data corresponding to the SVG and the capacitor compensation cabinet, $F_{2i}$ represents the functional index data of the APF, and $F_{3i}$ represents the functional index data of the DVR; $R_{1i}$ represents the economic index data corresponding to the SVG and the capacitor compensation cabinet, $R_{2i}$ represents the economic index data of the APF, and $R_{3i}$ represents the economic index data of the DVR; i represents the $i^{th}$ power distribution room, where i=1, ..., n, and n is an integer representing a total quantity of power distribution rooms; and $F_{ki}$ and $R'_{ki}$ respectively represent corresponding normalized functional index data and economic index data.

Then, an expression of a comprehensive evaluation index $C_i$ of the power distribution room is determined based on the processed functional index data, the processed economic index data, the function weight, and the economic weight:

$$C_i = \alpha(F'_{1i} + F'_{2i} + F'_{3i}) + \beta \frac{1}{R'_{1i} + R'_{2i} + R'_{3i}} \quad (11)$$

A comprehensive evaluation index $C_i$ of each compensation scheme under the optimization mode is calculated according to the expression (10).

A compensation scheme with a largest value of the comprehensive evaluation index $C_i$ is selected as an optimal scheme under the optimization mode, and the electric power quality control is performed on the oil production platform based on the optimal scheme. In the above expression, $\alpha$ represents the function weight, and $\beta$ represents the economic weight. Specifically, the optimal scheme includes an optimal compensation device and an optimal compensation capacity. Correspondingly, that the electric power quality control is performed on the oil production platform based on the optimal scheme includes:

the power distribution room of the oil production platform is configured based on the optimal compensation device and the optimal compensation capacity to perform the electric power quality control on the oil production platform.

For example, when the optimal compensation device includes the APF, the APF is centrally installed at the incoming line of the power distribution room.

When the optimal compensation device includes the DVR, the DVR is decentralizedly installed at the incoming line of the to-be-compensated electrical equipment in the power distribution room.

When the optimal compensation device includes the SVG, the SVG is centrally installed at an incoming line of a power distribution room for which the reactive power compensation is required or at an incoming line of electrical equipment in the power distribution room for which the reactive power compensation is required. A specific configuration mode depends on a power factor of the power distribution room or each piece of electrical equipment.

When the optimal compensation device includes the capacitor compensation cabinet, the capacitor compensation cabinet is centrally installed at the incoming line of the power distribution room for which the reactive power compensation is required or at the incoming line of the electrical equipment in the power distribution room for which the reactive power compensation is required. It should be noted that the capacitor compensation cabinet is generally installed at the incoming line of the power distribution room.

Embodiment: An actual offshore oil production platform is used as an example. The oil production platform includes four power distribution rooms. Basic topologies of the four power distribution rooms of the oil production platform are respectively shown in FIG. 7 to FIG. 10. An optimal electric power quality governance scheme proposed in the present disclosure can be used to obtain optimal configuration schemes of the four power distribution rooms included in the oil production platform. Specifically:

Firstly, based on measured electricity consumption data of loads of the oil production platform, it is determined that the oil production platform mainly has problems of a low power factor and a large harmonic, but a voltage sag problem of the oil production platform is not obvious. Therefore, for the oil production platform, a reactive power problem and a harmonic problem mainly need to be addressed. Capacities of a reactive power compensation device and a harmonic compensation device are calculated, such that following three preliminary schemes have been obtained for a load distribution inside the oil production platform.

| | Capacitor | SVG | APF |
|---|---|---|---|
| Scheme 1: The capacitor compensation cabinet is installed for reactive power compensation, and the APF is centrally installed for harmonic compensation. | B3(10 kVar), B4(20 kVar), B7(50 kVar), B8(50 kVar) | / | B1(15 A), B2(20 A), B5(11 A), B6(7.5 A), B7(25 A), B8(110 A) |
| Scheme 2: The SVG installed for the reactive power compensation, and the APF is centrally installed for the harmonic compensation. | / | B3(10 kVar), B4(20 kVar), L11(50 kVar), L16(7.5 kVar), L20(45 kVar) | B1(15 A), B2(20 A), B5(11 A), B6(7.5 A), B7(25 A), B8(110 A) |
| Scheme 3: Both the SVG and the capacitor compensation cabinet are installed for the reactive power compensation, and the APF is decentralizedly installed for the harmonic compensation. | B7(25 kVar), B8(25 kVar) | B3(10 kVar), B4(20 kVar), B7(25 kVar), B8(25 kVar) | L3(25 A), L4(11 A), L5(7.5 A), B5(11 A), B6(7.5 A), L11(10 A), L14(15 A), L17(18 A), L21(90 A) |

Based on the above schemes, functional and economic indexes of each scheme are calculated, as shown in a following table. Then, after the economic and functional indexes are normalized separately, a comprehensive evaluation index C is calculated for different schemes. Calculation results are shown in a following table.

| | Scheme 1 | Scheme 2 | Scheme 3 |
|---|---|---|---|
| Functional index | 412.75 | 415.25 | 462.5 |
| Economic index | 46800 | 72150 | 63300 |
| Comprehensive index (first mode) | 0.3001 | 0.3440 | 0.3551 |
| Comprehensive index (second mode) | 0.2757 | 0.3737 | 0.3506 |
| Comprehensive index (third mode) | 0.2883 | 0.3588 | 0.3529 |

Based on results of the comprehensive index, it can be intuitively seen that when the first mode is selected, which focuses on functionality, the scheme 3 is optimal. When the second mode is selected, which focuses on economical efficiency, the scheme 2 is optimal. When the third mode is selected, which balances the functionality and the economical efficiency, the scheme 2 is optimal. This indicates that although a capacitor compensation device has a lower cost, but its governance effect is not good. Therefore, when an effect of electric power quality governance is considered, capacitor compensation may not be a best approach. Although a decentralizedly configured reactive power or harmonic governance device can achieve a better governance effect, a cost of a plurality of devices is greater than that of a single device, which can also result in a significant increase in a device investment cost. Therefore, the comprehensive evaluation index that considers both the functional and economic indexes proposed in the present disclosure can be used to objectively select a better electric power quality control scheme and more specifically formulate and evaluate an electric power quality control scheme.

For example, the comprehensive evaluation index $C_i$ of the power distribution room is calculated based on the economic and functional indexes, as well as the optimization mode. The comprehensive evaluation index combines a governance effect and economical efficiency of the governance scheme. A larger value of the comprehensive evaluation index $C_i$ leads to a better scheme in an optimization mode under consideration. In a selected optimization mode, the comprehensive evaluation index $C_i$ is calculated for each scheme, and an optimal configuration scheme is selected to perform the electric power quality control on the oil production platform.

In this embodiment, typical electric power quality problems of an offshore oil production platform containing n power distribution rooms are addressed. The steps 203 and 204 are a scheme configuration process for the $i^{th}$ power distribution room (i=1, . . . , n). After a governance scheme for the $i^{th}$ power distribution room is completed, a governance scheme for an $(i+1)^{th}$ power distribution room is analyzed until governance schemes for the n power distribution rooms are completed.

In this embodiment of the present disclosure, a corresponding compensation scheme is configured for each electric power quality problem of a power distribution room with an electric power quality problem, in other words, different compensation schemes are provided for different problems, which can resolve various electric power quality problems and reduce effect limitations of electric power quality governance of an oil production platform. Moreover, the embodiment also considers functional and economic indexes of the compensation scheme, considering both economic efficiency and functionality of the electric power quality governance of the oil production platform. Therefore, a more suitable governance scheme can be selected to improve an effect of the electric power quality governance of the oil production platform.

In addition, in an embodiment, configuration optimization of the above scheme is targeted at a specific power distribution room for region-based optimization, and also targeted at a plurality of electric power quality problems for layer-based optimization. A region-based and layer-based configuration optimization process will be further described in FIG. 3.

Figure 3:
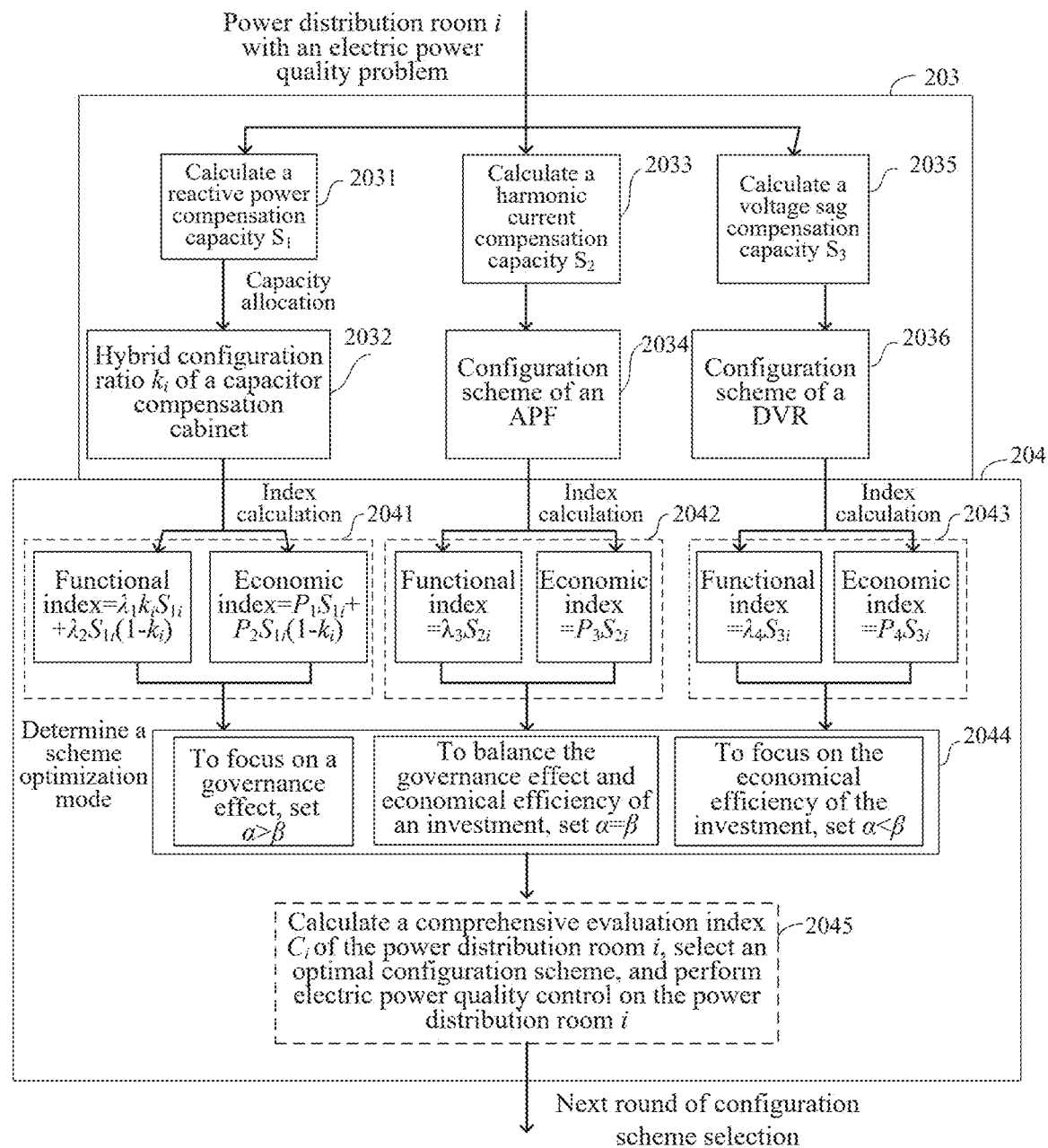
FIG. 3 is a schematic diagram of a region-based and layer-based configuration optimization process according to an embodiment of the present disclosure.

FIG. 3 shows the steps 203 and 204 of the electric power quality control method proposed in the present disclosure. The step 203 includes steps 2031 and 2032 for reactive power compensation configuration, steps 2033 and 2034 for harmonic compensation configuration, and steps 2035 and 2036 for voltage sag compensation configuration.

In the step 2031, a total reactive power compensation capacity $S_1$ of the $i^{th}$ power distribution room is calculated according to the expression (1). In the step 2032, a hybrid configuration ratio $k_i$ of the capacitor compensation cabinet and the SVG is determined. The capacitor equipment has the low cost, and the SVG has the high cost but the good compensation effect. Therefore, in order to consider both the economical efficiency and the compensation effect, the SVG and the capacitor compensation cabinet are used for the hybrid reactive power compensation. The configuration ratios of the capacitor compensation cabinet and the SVG are respectively $k_i$ and $1-k_i$. The sum of the compensation capacity of the capacitor compensation cabinet and the compensation capacity of the SVG should meet the requirement of the total compensation capacity. Specifically, when the voltage sag problem occurs in the power distribution room, the certain proportion of SVGs must be configured in the reactive power compensation device to ensure that $k_i<1$.

In the step 2032, because there are a plurality of configuration modes for the hybrid reactive power compensation, the configuration ratio $k_i$ of the capacitor compensation cabinet may be used to form different hybrid configuration schemes based on the gradient of 0.1 and the SVG. The configuration ratio may be further selected in the step 204.

In the step 2033, a total harmonic current compensation capacity $S_2$ of the $i^{th}$ power distribution room is calculated according to the expression (2). In the step 2034, a configuration scheme of the APF is determined. For a single power distribution room, centralized governance is adopted for the APF, with an APF with a capacity of $S_2$ configured at an incoming line of the power distribution room, or two or three small-capacity APFs may be decentralizedly configured as needed.

In the step 2035, the total voltage sag compensation capacity $S_3$ of the $i^{th}$ power distribution room is calculated according to the expression (3). In the step 2036, a configuration scheme of the DVR is determined. For a single power distribution room, decentralized governance is adopted for the DVR, and the DVR is configured at equipment with an important load or a great impact from the voltage sag. If a load in the power distribution room frequently starts and stops, and an overall voltage sag problem is severe, the DVR may also be centrally configured at the incoming line.

In the step 204, the steps 2041, 2042, and 2043 are respectively performed to calculate the functional and economic indexes for the reactive power, harmonic, and voltage sag compensation schemes in the step 203. For the reactive power compensation scheme, the functional index $F_{1i}$ is equal to $\lambda_1 k_i S_{1i}+\lambda_2 S_{1i}(1-k_i)$, and the economic index $R_{1i}$ is equal to $P_1 S_{1i}+P_2 S_{1i}(1-k_i)$. For the harmonic current compensation scheme, the functional index $F_{2i}$ is equal to $\lambda_3 S_{2i}$, and the economic index $R_{2i}$ is equal to $P_3 S_{2i}$. For the voltage sag compensation scheme, the functional index $F_{3i}$ is equal to $\lambda_4 S_{3i}$, and the economic index $R_{3i}$ is equal to $P_4 S_{3i}$.

After the plurality of compensation schemes are preliminarily formed, the governance scheme optimization mode is determined in the step 2044. The optimization mode includes the three modes that respectively focus on the governance effect, focus on the economical efficiency of the investment, and balance the governance effect and the economical efficiency of the investment. The governance effect and the economic efficiency are allocated based on the weight, and their weight coefficients are respectively defined as $\alpha$ and $\beta$. Weight allocation of the three optimization modes is as follows:

1) For the mod focusing on the governance effect, $\alpha>\beta$.
2) For the mode focusing on the economical efficiency of the investment, $\alpha<\beta$.
3) For the mode balancing the governance effect and the economical efficiency of the investment, $\alpha=\beta$.

In the step 2045, based on the economic and functional indexes, as well as the optimization mode, the functional index data and the economic index data are first normalized according to a formula (10), and then the comprehensive evaluation index $C_i$ is calculated for each governance scheme according to a formula (11).

$$\begin{cases} F'_{ki} = \dfrac{F_{ki}}{\sum_{i=1}^{n}(F_{1i}+F_{2i}+F_{3i})} \\ R'_{ki} = \dfrac{R_{ki}}{\sum_{i=1}^{n}(R_{1i}+R_{2i}+R_{3i})} \end{cases} \quad (10)$$

$$C_i = \alpha(F'_{1i}+F'_{2i}+F'_{3i}) + \beta\dfrac{1}{R'_{1i}+R'_{2i}+R'_{3i}} \quad (11)$$

The comprehensive evaluation index $C_i$ combines the governance effect and the economical efficiency of the governance scheme. A larger value of the comprehensive evaluation index $C_i$ leads to a better scheme in an optimization mode under consideration. The comprehensive evaluation index $C_i$ is calculated for each scheme, and an optimal configuration scheme is selected to perform the electric power quality control on the $i^{th}$ power distribution room.

In general, the steps 203 and 204 involve configuration optimization of a certain power distribution room. After one power distribution room is optimized, an optimal scheme is determined, and then a next power distribution room is optimized until the entire platform is optimized. Finally, an electric power quality governance scheme of the entire oil production platform is determined.

It can be seen that the present disclosure performs governance on the region of the specific power distribution room of the specific offshore oil production platform based on the region-based and layer-based compensation scheme, thereby addressing the electric power quality problems more thoroughly, and provides the corresponding governance schemes for the different typical electric power quality problems, achieving the more targeted governance effect. The electric power quality governance scheme proposed in the present disclosure considers both the economical efficiency and the functionality. Different optimization modes can be selected to fully achieve the trade-off between the governance effect and the economical efficiency of the scheme to select the most suitable compensation scheme.

In the electric power quality governance scheme provided in the present disclosure, the hybrid compensation mode in which both the capacitor compensation cabinet and the SVG are used makes full use of the advantages of the low cost of the capacitor and the good governance effect of the SVG, to maximize the effect and the cost utilization.

It should be understood that the serial number of each step in the above embodiments does not indicate an order of performing the step. An order of performing each process is determined by its function and internal logic, and should not limit the implementation of the embodiments of the present disclosure.

Based on the electric power quality control method for an oil production platform, an embodiment of the present disclosure provides an electric power quality control device for an oil production platform. Referring to FIG. 4, the electric power quality control device for an oil production platform in the present disclosure is detailed below.

The electric power quality control device for an oil production platform includes: an electric power quality obtaining module 301, an electric power quality analysis module 302, a compensation scheme configuration module 303, and an electric power quality control module 304.

The electric power quality obtaining module 301 is configured to obtain test data of electrical loads of a plurality of power distribution rooms of an oil production platform, and determine electric power quality index data of each power distribution room of the oil production platform based on the test data of the electrical loads.

The electric power quality analysis module 302 is configured to determine a power distribution room with an electric power quality problem based on the electric power quality index data of each power distribution room and a preset index range.

The compensation scheme configuration module 303 is configured to configure a corresponding compensation scheme based on each electric power quality problem of the power distribution room with the electric power quality problem, where the compensation scheme includes a compensation device and a compensation capacity.

The electric power quality control module 304 is configured to determine, based on the compensation device and the compensation capacity, functional index data and economic index data that are corresponding to each compensation device, and perform electric power quality control on the oil production platform based on the functional index data and the economic index data.

That the compensation scheme configuration module 303 is configured to configure the corresponding compensation scheme based on each electric power quality problem of the power distribution room with the electric power quality problem includes: If the electric power quality problem is a reactive power problem, the compensation device is configured to include an SVG and a capacitor compensation cabinet, and compensation capacities of the SVG and the capacitor compensation cabinet are determined based on maximum active power, a power factor before compensation, and a power factor after the compensation of a load in the corresponding power distribution room. If the electric power quality problem is a harmonic problem, the compensation device is configured to include an APF, and a compensation capacity of the APF is determined based on a fundamental current, a harmonic current, and a total harmonic distortion of current of an incoming line of the power distribution room. If the electric power quality problem is a voltage sag problem, the compensation device is configured to include a DVR, and a compensation capacity of the DVR is determined based on a load-side current before a voltage sag, a load-side voltage before the voltage sag, and a load-side voltage after the voltage sag.

That the compensation scheme configuration module 303 is further configured to determine the compensation capacities of the SVG and the capacitor compensation cabinet based on the maximum active power, the power factor before the compensation, and the power factor after the compensation of the load in the corresponding power distribution room includes: According to a following expression:

$$S_1 = P_1(\tan(\arccos \phi_1) - \tan(\arccos \phi_2)) \quad (1)$$

the compensation capacities $S_1$ of the SVG and the capacitor compensation cabinet are determined, where $P_1$ represents the maximum active power of the load in the corresponding power distribution room; $\cos \phi_1$ represents the power factor before the compensation of the load in the corresponding power distribution room; and $\cos \phi_2$ represents the power factor after the compensation of the load in the corresponding power distribution room. The power factor after the compensation is a target power factor that meets a standard requirement.

That the compensation capacity of the APF is determined based on the fundamental current, the harmonic current, and the total harmonic distortion of current of the incoming line of the power distribution room includes:

According to a following expression:

$$S_2 = I_h = I_{rms} \times THD_i \qquad (2)$$

the compensation capacity $S_2$ of the APF is determined, where $I_{rms}$ represents an effective value of the fundamental current of the incoming line of the power distribution room; $I_h$ represents the harmonic current; and $THD_i$ represents the total harmonic distortion of current.

That the compensation capacity of the DVR is determined based on the load-side current before a voltage sag, the load-side voltage before the voltage sag, and the load-side voltage after the voltage sag includes:

According to a following expression:

$$S_3 = I_L(\cos\theta + j\sin\theta)(U_L - U_{sag}) \qquad (3)$$

the compensation capacity $S_3$ of the DVR is determined, where $I_L$ represents the load-side current before the voltage sag; $U_L$ represents the load-side voltage before the voltage sag; $U_{sag}$ represents the load-side voltage after the voltage sag; $\theta$ represents a load-side power factor angle before the voltage sag; and j represents an imaginary unit.

That the electric power quality control module 304 is further configured to determine, based on the compensation device and the compensation capacity, the functional index data and the economic index data that are corresponding to each compensation device includes: A price per unit capacity of each compensation device is obtained, and a function coefficient of each compensation device is determined. The functional index data corresponding to each compensation device is obtained based on the function coefficient and a compensation capacity of each compensation device, and the economic index data corresponding to each compensation device is obtained based on the price per unit capacity and the compensation capacity of each compensation device.

That the electric power quality control module 304 is further configured to obtain, based on the function coefficient and the compensation capacity of each compensation device, the functional index data corresponding to each compensation device includes:

If the compensation device includes the SVG and the capacitor compensation cabinet, according to a following expression:

$$F_{1i} = \lambda_1 k_i S_{1i} + \lambda_2 S_{1i}(1 - k_i) \qquad (4)$$

functional index data $F_{1i}$ corresponding to the SVG and the capacitor compensation cabinet in an $i^{th}$ power distribution room is obtained.

If the compensation device includes the APF, according to a following expression:

$$F_{2i} = \lambda_3 S_{2i} \qquad (5)$$

functional index data $F_{2i}$ of the APF in the $i^{th}$ power distribution room is obtained.

If the compensation device includes the DVR, according to a following expression:

$$F_{3i} = \lambda_4 S_{3i} \qquad (6)$$

functional index data $F_{3i}$ of the DVR in the $i^{th}$ power distribution room is obtained. In the above expressions, i represents the $i^{th}$ power distribution room, where i=1, ..., n; $\lambda_1$ represents a function coefficient of the capacitor compensation cabinet, $\lambda_2$ represents a function coefficient of the SVG, $\lambda_3$ represents a function coefficient of the APF, and $\lambda_4$ represents a function coefficient of the DVR; $k_i$ represents a configuration ratio of the capacitor compensation cabinet; and $1-k_i$ represents a configuration ratio of the SVG.

That the economic index data corresponding to each compensation device is obtained based on the price per unit capacity and the compensation capacity of each compensation device includes:

If the compensation device includes the SVG and the capacitor compensation cabinet, according to a following expression:

$$R_{1i} = P_1 S_{1i} + P_2 S_{1i}(1 - k_i) \qquad (7)$$

economic index data $R_{1i}$ corresponding to the SVG and the capacitor compensation cabinet in the $i^{th}$ power distribution room is obtained.

If the compensation device includes the APF, according to a following expression:

$$R_{2i} = P_3 S_{2i} \qquad (8)$$

economic index data $R_{2i}$ of the APF in the $i^{th}$ power distribution room is obtained.

If the compensation device includes the DVR, according to a following expression:

$$R_{3i} = P_4 S_{3i} \qquad (9)$$

economic index data $R_{3i}$ of the DVR in the $i^{th}$ power distribution room is obtained.

In the above expressions, $P_1$ represents a price per unit capacity of the capacitor compensation cabinet; $P_2$ represents a price per unit capacity of the SVG; $P_3$ represents a price per unit capacity of the APF; and $P_4$ represents a price per unit capacity of the DVR.

That the electric power quality control is performed on the oil production platform based on the functional index data and the economic index data includes: An optimization mode of the compensation scheme is obtained based on a governance requirement, and a function weight and an economic weight are configured; and an expression of a comprehensive evaluation index $C_i$ of the power distribution room is determined based on the functional index data, the economic index data, the function weight, and the economic weight:

$$C_i = \alpha(F_{1i} + F_{2i} + F_{3i}) + \beta \frac{1}{R_{1i} + R_{2i} + R_{3i}} \qquad (10)$$

According to the expression, the comprehensive evaluation index $C_i$ is calculated for each compensation scheme under the optimization mode. In the above expression, $\alpha$ represents the function weight, and $\beta$ represents the economic weight; $F_{1i}$ represents the functional index data corresponding to the SVG and the capacitor compensation cabinet, $F_{2i}$ represents the functional index data of the APF, and $F_{3i}$ represents the functional index data of the DVR; and $R_{1i}$ represents the economic index data corresponding to the SVG and the capacitor compensation cabinet, $R_{2i}$ represents the economic index data of the APF, and $R_{3i}$ represents the economic index data of the DVR. A compensation scheme with a largest value of the comprehensive evaluation index $C_i$ is selected as an optimal scheme under the optimization mode, and the electric power quality control is performed on the oil production platform based on the optimal scheme.

For example, that the optimization mode of the compensation scheme is obtained based on the governance requirement, and the function weight and the economic weight are configured includes: If the optimization mode obtained for the compensation scheme based on the governance requirement is a first mode, the function weight is set to be greater than the economic weight. If the optimization mode obtained for the compensation scheme based on the governance requirement is a second mode, the function weight is set to be less than the economic weight. If the optimization mode obtained for the compensation scheme based on the governance requirement is a third mode, the function weight is set to be equal to the economic weight.

It should be noted that information exchange and execution processes between the above-mentioned apparatuses are based on a same concept as those in the method embodiments of the present disclosure. Therefore, for specific functions and technical effects of the apparatuses, reference may be made to the method embodiments, and details are not described herein again.

Those skilled in the art should clearly understand that, for convenient and concise description, only the division of the above-mentioned functional units/modules is used as an example for illustration. In practical application, the above-mentioned functions may be realized by different functional units/modules as required, that is, an internal structure of the apparatus is divided into different functional units or modules to complete all or part of the above-described functions. The functional units/modules in the embodiments may be integrated into one processing unit, or each of the units may exist alone physically, or two or more units are integrated into one unit. The above integrated unit may be implemented either in a form of hardware or in a form of a software functional unit. In addition, specific names of the functional units/modules are only for the convenience of distinguishing each other, and are not intended to limit the protection scope of the present disclosure. For specific working processes of the units/modules in the above system, reference may be made to the corresponding processes in the above method embodiments, and details are not described herein again.

In the embodiments of the present disclosure, the electric power quality obtaining module 301, the electric power quality analysis module 302, the compensation scheme configuration module 303, and the electric power quality control module 304 each may be one or more processors, controllers, or chips that each have a communication interface, can realize a communication protocol, and may further include a memory, a related interface and system transmission bus, and the like if necessary. The processor, controller, or chip executes program-related code to realize a corresponding function. In an alternative solution, the electric power quality obtaining module 301, the electric power quality analysis module 302, the compensation scheme configuration module 303, and the electric power quality control module 304 may share an integrated chip or share devices such as a processor, a controller, and a memory. The shared processor, controller, or chip executes program-related code to implement a corresponding function.

Figure 5:
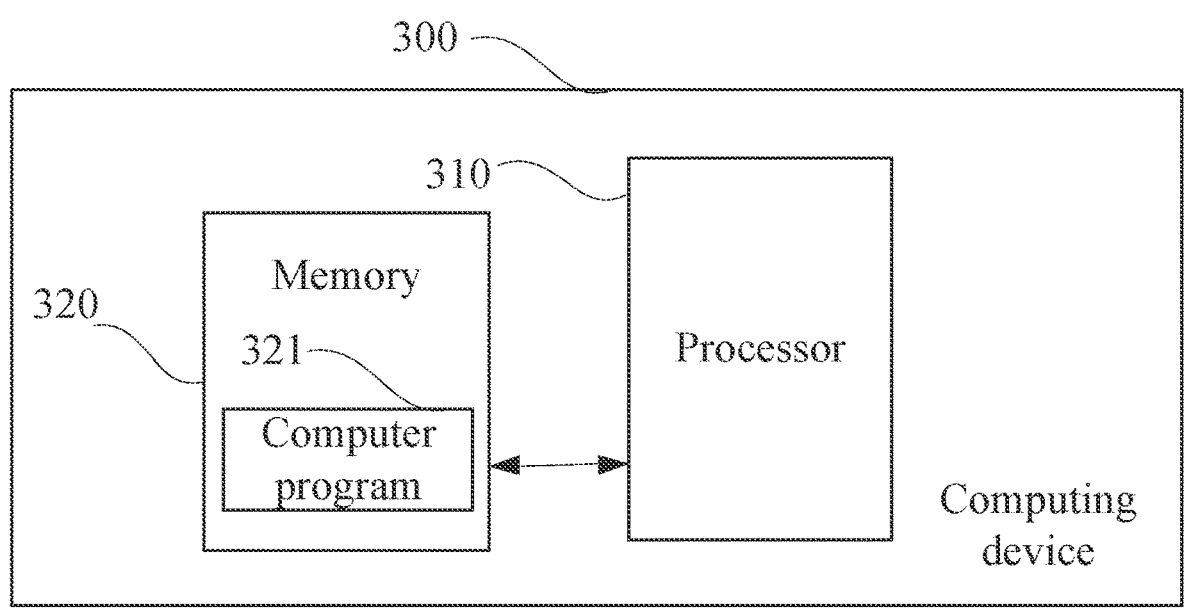
FIG. 5 is a schematic structural diagram of a computing device according to an embodiment of the present disclosure.

The embodiments of the present disclosure further provide a computing device. Referring to FIG. 5, the computing device 300 may include at least one processor 310 and a memory 320. The memory 320 stores a computer program 321 executable on the at least one processor 310. The processor 310 executes the computer program 321 to implement the steps in any one of the above method embodiments, for example, the steps 201 to 204 in the embodiment shown in FIG. 2. Alternatively, the processor 310 executes the computer program 321 to implement the functions of the modules/units in each above-mentioned apparatus embodiment, for example, the functions of the modules 301 to 304 shown in FIG. 4.

For example, the computer program 321 may be divided into at least one module/unit. The at least one module/unit is stored in the memory 320 and executed by the processor 310 to complete the present disclosure. The at least one module/unit may be a series of computer program segments capable of implementing specific functions, and the computer program segments are used for describing an execution process of the computer program 321 in the computing device 300.

Those skilled in the art can understand that FIG. 5 shows only an example of the computing device, does not constitute a limitation to the computing device, and may include more or less components than those shown in the figure, a combination of some components, or different components, for example, input and output devices, a network access device, and a bus.

The processor 310 may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor may be any conventional processor or the like.

The memory 320 may be a storage unit in the computing device, or may be an external storage device of the computing device, such as a plug-in hard disk, a smart media card (SMC), a secure digital (SD) card, or a flash card. The memory 320 is configured to store the computer program and other programs and data required by the computing device. The memory 320 may further be configured to temporarily store data that has been output or will be output.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of the present disclosure is not limited to only one bus or only one type of bus.

The electric power quality control method for an oil production platform provided in the embodiments of the present disclosure can be applied to computing devices such as a computer, a tablet, a laptop, a netbook, and a personal digital assistant (PDA). The embodiments of the present disclosure do not impose any restriction on a specific type of the computing device.

In the above embodiments, the description of the embodiments each has a focus, and portions not described or recorded in detail in one embodiment may refer to the description of other embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

In the embodiments provided in the present disclosure, it should be understood that the disclosed apparatus/network device and method may be implemented in other manners. For example, the described apparatus/network device embodiment is merely an example. For example, the module or unit division is merely logical function division and may be other division in actual implementation. For example, a plurality of units or components may be combined or integrated into another system, or some features may be ignored or not executed. In addition, the intercoupling or direct coupling or communication connection shown or discussed may be indirect coupling or communication connection through some interfaces, apparatuses, or units; or may be implemented in electrical, mechanical, or other forms.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of the embodiments.

Finally, it should be noted that the above embodiments are merely intended to explain the technical solutions of the present disclosure, rather than to limit the present disclosure. Although the present disclosure is described in detail with reference to the above embodiments, those of ordinary skill in the art should understand that they can still modify the technical solutions described in the above embodiments or make equivalent substitutions on some technical features therein without departing from the spirit and scope of the technical solutions in the embodiments of the present disclosure. However, these modifications or substitutions should fall within the protection scope of the present application.

The invention claimed is:

1. An electric power quality control method for an oil production platform, comprising:

obtaining test data of electrical loads of a plurality of power distribution rooms of an oil production platform, and determining electric power quality index data of each power distribution room of the oil production platform based on the test data of the electrical loads;

determining a power distribution room with an electric power quality problem based on the electric power quality index data of each power distribution room and a preset index range;

configuring a corresponding compensation scheme based on each electric power quality problem of the power distribution room with the electric power quality problem, wherein the compensation scheme comprises a compensation device and a compensation capacity; and determining, based on the compensation device and the compensation capacity, functional index data and economic index data that are corresponding to each compensation device, and performing electric power quality control on the oil production platform based on the functional index data and the economic index data.

2. The electric power quality control method for an oil production platform according to claim 1, wherein the configuring a corresponding compensation scheme based on each electric power quality problem of the power distribution room with the electric power quality problem comprises:

if the electric power quality problem is a reactive power problem, configuring the compensation device to comprise a static var generator (SVG) and a capacitor compensation cabinet, and determining compensation capacities of the SVG and the capacitor compensation cabinet based on maximum active power, a power factor before compensation, and a power factor after the compensation of a load in the corresponding power distribution room;

if the electric power quality problem is a harmonic problem, configuring the compensation device to comprise an active power filter (APF), and determining a compensation capacity of the APF based on a fundamental current, a harmonic current, and a total harmonic distortion of current of an incoming line of the power distribution room; or if the electric power quality problem is a voltage sag problem, configuring the compensation device to comprise a dynamic voltage restorer (DVR), and determining a compensation capacity of the DVR based on a load-side current before a voltage sag, a load-side voltage before the voltage sag, and a load-side voltage after the voltage sag.

3. The electric power quality control method for an oil production platform according to claim 2, wherein the determining compensation capacities of the SVG and the capacitor compensation cabinet based on maximum active power, a power factor before compensation, and a power factor after the compensation of a load in the corresponding power distribution room comprises:

according to a following expression:

$$S_1 = P_1(\tan(\arccos \phi_1) - \tan(\arccos \phi_2))$$

determining the compensation capacities $S_1$ of the SVG and the capacitor compensation cabinet, wherein $P_1$ represents the maximum active power of the load in the corresponding power distribution room; $\cos \phi_1$ represents the power factor before the compensation of the load in the corresponding power distribution room; and $\cos \phi_2$ represents the power factor after the compensation of the load in the corresponding power distribution room;

the determining a compensation capacity of the APF based on a fundamental current, a harmonic current, and a total harmonic distortion of current of an incoming line of the power distribution room comprises:
according to a following expression:

$$S_2 = I_h = I_{rms} \times THD_i$$

determining the compensation capacity $S_2$ of the APF, wherein $I_{rms}$ represents an effective value of the fundamental current of the incoming line of the power distribution room; In represents the harmonic current; and $THD_i$ represents the total harmonic distortion of current, wherein i represents an $i^{th}$ power distribution room, i=1, ..., n, and n is an integer; and the determining a compensation capacity of the DVR based on a load-side current before a voltage sag, a load-side voltage before the voltage sag, and a load-side voltage after the voltage sag comprises:
according to a following expression:

$$S_3 = I_L(\cos\theta + j\sin\theta)(U_L - U_{sag})$$

determining the compensation capacity $S_3$ of the DVR, wherein $I_L$ represents the load-side current before the voltage sag; $U_L$ represents the load-side voltage before the voltage sag; $U_{sag}$ represents the load-side voltage after the voltage sag; $\theta$ represents a load-side power factor angle before the voltage sag; and j represents an imaginary unit.

4. A computing device, comprising a memory and a processor, wherein the memory stores a computer program executable on the processor, and the computer program is executed by the processor to implement the electric power quality control method for an oil production platform according to claim 3.

5. A non-transitory computer-readable storage medium, wherein the non-transitory computer-readable storage medium stores a computer program, and the computer program is executed by a processor to implement the electric power quality control method for an oil production platform according to claim 3.

6. A computing device, comprising a memory and a processor, wherein the memory stores a computer program executable on the processor, and the computer program is executed by the processor to implement the electric power quality control method for an oil production platform according to claim 2.

7. A non-transitory computer-readable storage medium, wherein the non-transitory computer-readable storage medium stores a computer program, and the computer program is executed by a processor to implement the electric power quality control method for an oil production platform according to claim 2.

8. The electric power quality control method for an oil production platform according to claim 1, wherein the determining, based on the compensation device and the compensation capacity, functional index data and economic index data that are corresponding to each compensation device comprises:

obtaining a price per unit capacity of each compensation device, and determining a function coefficient of each compensation device; and obtaining, based on the function coefficient and a compensation capacity of each compensation device, the functional index data corresponding to each compensation device, and obtaining, based on the price per unit capacity and the compensation capacity of each compensation device, the economic index data corresponding to each compensation device.

9. The electric power quality control method for an oil production platform according to claim 8, wherein the obtaining, based on the function coefficient and a compensation capacity of each compensation device, the functional index data corresponding to each compensation device comprises:

if the compensation device comprises an SVG and a capacitor compensation cabinet, according to a following expression:

$$F_{1i} = \lambda_1 k_i S_{1i} + \lambda_2 S_{1i}(1 - k_i)$$

obtaining functional index data $F_{1i}$ corresponding to the SVG and the capacitor compensation cabinet in an $i^{th}$ power distribution room;

if the compensation device comprises an APF, according to a following expression:

$$F_{2i} = \lambda_3 S_{2i}$$

obtaining functional index data $F_{2i}$ of the APF in the $i^{th}$ power distribution room; or if the compensation device comprises a DVR, according to a following expression:

$$F_{3i} = \lambda_4 S_{3i}$$

obtaining functional index data $F_{3i}$ of the DVR in the $i^{th}$ power distribution room, wherein i represents the $i^{th}$ power distribution room, i=1, ..., n, and n is an integer; $\lambda_1$ represents a function coefficient of the capacitor compensation cabinet, $\lambda_2$ represents a function coefficient of the SVG, $\lambda_3$ represents a function coefficient of the APF, and $\lambda_4$ represents a function coefficient of the DVR; $k_i$ represents a configuration ratio of the capacitor compensation cabinet, and $1-k_i$ represents a configuration ratio of the SVG; and $S_{1i}$ represents compensation capacities of the SVG and the capacitor compensation cabinet in the $i^{th}$ power distribution room, $S_{2i}$ represents a compensation capacity of the APF in the $i^{th}$ power distribution room, and $S_{3i}$ represents a compensation capacity of the DVR in the $i^{th}$ power distribution room; and the obtaining, based on the price per unit capacity and the compensation capacity of each compensation device, the economic index data corresponding to each compensation device comprises:

if the compensation device comprises the SVG and the capacitor compensation cabinet, according to a following expression:

$$R_{1i} = P_1 S_{1i} + P_2 S_{1i}(1 - k_i)$$

obtaining economic index data $R_{1i}$ corresponding to the SVG and the capacitor compensation cabinet in the $i^{th}$ power distribution room;

if the compensation device comprises the APF, according to a following expression:

$$R_{2i}=P_3 S_{2i}$$

obtaining economic index data $R_{2i}$ of the APF in the $i^{th}$ power distribution room; or if the compensation device comprises the DVR, according to a following expression:

$$R_{3i}=P_4 S_{3i}$$

obtaining economic index data $R_{3i}$ of the DVR in the $i^{th}$ power distribution room;

wherein $P_1$ represents a price per unit capacity of the capacitor compensation cabinet; $P_2$ represents a price per unit capacity of the SVG; $P_3$ represents a price per unit capacity of the APF; and $P_4$ represents a price per unit capacity of the DVR.

10. A computing device, comprising a memory and a processor, wherein the memory stores a computer program executable on the processor, and the computer program is executed by the processor to implement the electric power quality control method for an oil production platform according to claim 9.

11. A non-transitory computer-readable storage medium, wherein the non-transitory computer-readable storage medium stores a computer program, and the computer program is executed by a processor to implement the electric power quality control method for an oil production platform according to claim 9.

12. A computing device, comprising a memory and a processor, wherein the memory stores a computer program executable on the processor, and the computer program is executed by the processor to implement the electric power quality control method for an oil production platform according to claim 8.

13. A non-transitory computer-readable storage medium, wherein the non-transitory computer-readable storage medium stores a computer program, and the computer program is executed by a processor to implement the electric power quality control method for an oil production platform according to claim 8.

14. The electric power quality control method for an oil production platform according to claim 1, wherein the performing electric power quality control on the oil production platform based on the functional index data and the economic index data comprises:

obtaining an optimization mode of the compensation scheme based on a governance requirement, and configuring a function weight and an economic weight;

normalizing functional index data and economic index data of each compensation scheme separately, wherein expressions for the normalization are as follows:

$$\begin{cases} F'_{ki} = \dfrac{F_{ki}}{\sum_{i=1}^{n}(F_{1i}+F_{2i}+F_{3i})} \\ R'_{ki} = \dfrac{R_{ki}}{\sum_{i=1}^{n}(R_{1i}+R_{2i}+R_{3i})} \end{cases}$$

wherein k=1, 2, or 3; $F_{1i}$ represents functional index data corresponding to an SVG and a capacitor compensation cabinet, $F_{2i}$ represents functional index data of an APF, and $F_{3i}$ represents functional index data of a DVR; $R_{1i}$ represents economic index data corresponding to the SVG and the capacitor compensation cabinet, $R_{2i}$ represents economic index data of the APF, and $R_{3i}$ represents economic index data of the DVR; i represents an $i^{th}$ power distribution room, where i=1, . . . , n, and n is an integer representing a total quantity of power distribution rooms; and $F'_{ki}$ and $R'_{ki}$ respectively represent corresponding normalized functional index data and economic index data;

determining an expression of a comprehensive evaluation index $C_i$ of the power distribution room based on the normalized functional index data, the normalized economic index data, the function weight, and the economic weight:

$$C_i = \alpha(F'_{1i}+F'_{2i}+F'_{3i}) + \beta\dfrac{1}{R'_{1i}+R'_{2i}+R'_{3i}}$$

calculating a comprehensive evaluation index $C_i$ of each compensation scheme under the optimization mode according to the expression, wherein $\alpha$ represents the function weight, and $\beta$ represents the economic weight; and selecting a compensation scheme with a largest value of the comprehensive evaluation index $C_i$ as an optimal scheme under the optimization mode, and performing the electric power quality control on the oil production platform based on the optimal scheme.

15. The electric power quality control method for an oil production platform according to claim 14, wherein the optimization mode comprises a first mode, a second mode, and a third mode, and the first mode, the second mode, and the third mode are different; and the obtaining an optimization mode of the compensation scheme based on a governance requirement, and configuring a function weight and an economic weight comprises:

if the optimization mode obtained for the compensation scheme based on the governance requirement is the first mode, setting the function weight to be greater than the economic weight;

if the optimization mode obtained for the compensation scheme based on the governance requirement is the second mode, setting the function weight to be less than the economic weight; or if the optimization mode obtained for the compensation scheme based on the governance requirement is the third mode, setting the function weight to be equal to the economic weight.

16. A computing device, comprising a memory and a processor, wherein the memory stores a computer program executable on the processor, and the computer program is executed by the processor to implement the electric power quality control method for an oil production platform according to claim 15.

17. A computing device, comprising a memory and a processor, wherein the memory stores a computer program executable on the processor, and the computer program is executed by the processor to implement the electric power quality control method for an oil production platform according to claim 14.

18. A computing device, comprising a memory and a processor, wherein the memory stores a computer program executable on the processor, and the computer program is executed by the processor to implement the electric power quality control method for an oil production platform according to claim 1.

19. A non-transitory computer-readable storage medium, wherein the non-transitory computer-readable storage medium stores a computer program, and the computer program is executed by a processor to implement the electric power quality control method for an oil production platform according to claim 1.

20. An electric power quality control device for an oil production platform, comprising:
- an electric power quality obtaining module configured to obtain test data of electrical loads of a plurality of power distribution rooms of an oil production platform, and determine electric power quality index data of each power distribution room of the oil production platform based on the test data of the electrical loads;
- an electric power quality analysis module configured to determine a power distribution room with an electric power quality problem based on the electric power quality index data of each power distribution room and a preset index range;
- a compensation scheme configuration module configured to configure a corresponding compensation scheme based on each electric power quality problem of the power distribution room with the electric power quality problem, wherein the compensation scheme comprises a compensation device and a compensation capacity; and
- an electric power quality control module configured to determine, based on the compensation device and the compensation capacity, functional index data and economic index data that are corresponding to each compensation device, and perform electric power quality control on the oil production platform based on the functional index data and the economic index data.

* * * * *